No. 880,195. PATENTED FEB. 25, 1908.
E. COLLINS.
TIRE ATTACHMENT.
APPLICATION FILED SEPT. 13, 1907.
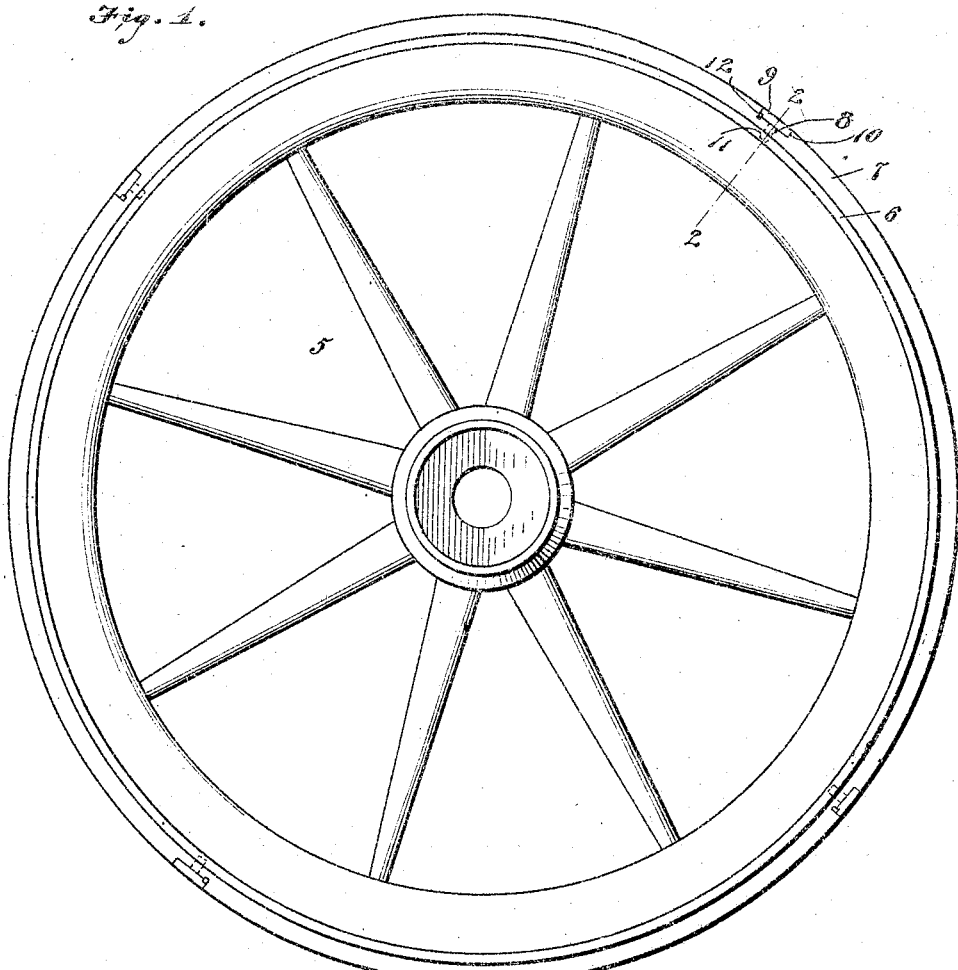
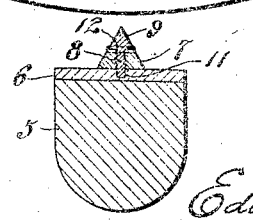
Edward Collins,
Inventor
Witnesses
Arthur Wesley
M. A. Schmidt

UNITED STATES PATENT OFFICE.

EDWARD COLLINS, OF EKALAKA, MONTANA.

TIRE ATTACHMENT.

No. 880,195.      Specification of Letters Patent.      Patented Feb. 25, 1908.

Application filed September 13, 1907. Serial No. 392,764.

*To all whom it may concern:*

Be it known that I, EDWARD COLLINS, a citizen of the United States, residing at Ekalaka, in the county of Custer and State of Montana, have invented certain new and useful Improvements in Tire Attachments, of which the following is a specification.

This invention is an attachment for vehicle tires, to prevent slipping on the ice or frozen ground, and it has for its object to provide a device of this kind embodying simplicity of construction and also one which can be readily attached to and removed from the tire.

In the accompanying drawing, Figure 1 is an elevation of a vehicle wheel showing the application of the invention. Fig. 2 is an enlarged sectional view on the line 2—2 of Fig. 1.

Referring specifically to the drawing, 5 denotes an ordinary vehicle wheel provided with the usual flat metallic tire 6.

The attachment comprises a metallic band 7, fitting on and completely encircling the tire 6. The band is triangular in cross section with its base next to the tread of the tire and its apex outwardly presented to form a cutting edge which is concentric to the tire 6. The band 7 is secured to the tire 6 by means of bolts 8, the heads 9 of which fit in recesses or notches 10 made in the apex of the band. The bolt-heads are also triangular in cross section so that they will extend flush with the apex and the sides of the band. The continuity of the cutting edge of the band is therefore not interrupted. The bolts pass through the band and extend into holes 11 made in the tire 6. Only that portion of the bolt which passes through the band is threaded. The bolts are locked against turning by pins 12 driven between the bolt heads and the band. The bolt-heads 9 are rounded at their ends and the walls of the notches are shaped accordingly, so that the heads may turn therein.

The attachment herein described can be readily put on and taken off the tire, and by reason of its simplicity of construction it can be cheaply produced. The cutting edge of the band readily penetrates the ice or frozen ground, and effectually prevents slipping of the wheel.

I claim

An attachment for vehicle tires comprising a band encircling the tire, said band being triangular in cross section with its apex notched and outwardly presented, and fastening bolts passing through the band into the tire, said bolts having their heads fitting in the notches in the band, and shaped to extend flush with the apex and the sides of the band.

In testimony whereof I affix my signature, in presence of two witnesses.

EDWARD COLLINS.

Witnesses:
  W. FREESE,
  M. O. TRACY.